Sept. 19, 1961 L. V. GUEST 3,000,637

RECORD SUPPORTING AND RELEASING SPINDLE FOR AUTOMATIC TALKING MACHINES

Filed June 20, 1958 3 Sheets-Sheet 1

INVENTOR
Lawrence V. Guest
BY
Ralph B. Stewart
ATTORNEY

Sept. 19, 1961

L. V. GUEST 3,000,637

RECORD SUPPORTING AND RELEASING SPINDLE FOR AUTOMATIC TALKING MACHINES

Filed June 20, 1958

3 Sheets-Sheet 2

INVENTOR

Lawrence V. Guest

BY

Ralph B. Stewart

ATTORNEY

Sept. 19, 1961 L. V. GUEST 3,000,637

RECORD SUPPORTING AND RELEASING SPINDLE FOR AUTOMATIC TALKING MACHINES

Filed June 20, 1958 3 Sheets-Sheet 3

INVENTOR
Lawrence V. Guest
BY
Ralph B. Stewart
ATTORNEY 3,000,637

RECORD SUPPORTING AND RELEASING SPINDLE FOR AUTOMATIC TALKING MACHINES

Lawrence Vincent Guest, Old Hill, England, assignor to Birmingham Sound Reproducers Limited, Old Hill, Staffordshire, England, a British company Filed June 20, 1958, Ser. No. 743,401
Claims priority, application Great Britain June 25, 1957
3 Claims. (Cl. 274—10)

The present invention relates to improved record supporting and releasing mechanism for automatic talking machines, including a spindle extending upwards from the centre of the turntable of the machine and presenting a shoulder for supporting a stack of records applied over the upper end of the spindle, and from the lower end of which stack the records are released singly by an automatically operated releasing member in the spindle which moves the lowermost record of the stack in its own plane to disengage the edge of the hole in the record from the shoulder on the spindle, so that the record may fall down the spindle into the playing position.

It is an object of the invention to provide an improved mechanism with which the weight of records above the lowest in the stack is taken by the release member as the lowest record is released, and the remaining records thereafter lowered on to the shoulder of the spindle under the control of the release member.

In accordance with the present invention a record supporting and releasing mechanism is provided comprising a spindle presenting a shoulder at one side and spaced from the upper end thereof, a keeper member projecting at the side of the spindle opposite to the shoulder with its lower end above the level of the shoulder by a distance which is greater than the thickness of one and less than the thickness of two records, a release lever mounted in an axial slot in said spindle and capable of limited up and down movement and transverse rocking movement in said slot, said release lever being urged both yieldingly upwards to a position in which its upper end is engaged in the hole in the lowermost record of a stack on the spindle but below the next to lowermost record in the stack, and transversely so that its upper end is urged yieldingly in the direction away from the shoulder, means for rocking said lever in the direction to move its upper end towards the shoulder to disengage the lowermost record therefrom, and co-operating elements on the spindle and the release lever comprising a surface inclined to the vertical on one and a pin or like abutment on the other adapted to engage one another at a point near one end of the inclined surface when the release lever has been rocked to release the lowermost record, the arrangement being such that the upward bias of the release lever is overcome by transfer of the weight of the remainder of the stack of records to the upper end of the release lever after release of the lowermost record from the shoulder of the spindle and the upper end of the release lever is constrained to move transversely in the direction away from the said shoulder by sliding engagement of the said inclined surface with the said pin or like abutment during downward movement of the release lever under the weight of said remainder of the stack to deposit said remainder of the stack upon the shoulder of the spindle.

The invention is illustrated by way of example in the accompanying drawings in which.

Figure 1:
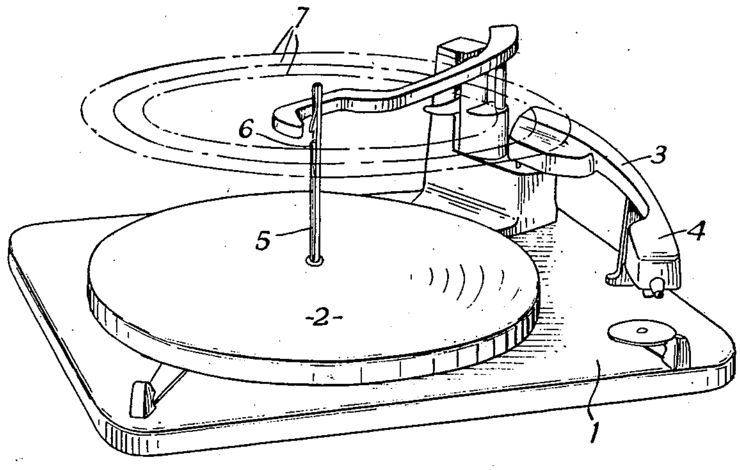
FIG. 1 illustrates an automatic record playing machine of the kind to which the present invention relates.

Referring to FIG. 1 the machine shown comprises a motor board 1, a turntable 2 rotatable about a fixed axis on the motor board, a conventional pick-up arm 3 and pick-up 4 and a record supporting spindle 5 mounted to extend upwards from the centre of the turntable 2, the spindle 5 being incapable of rotation and having a shoulder 6 near its upper end to support a stack of disc records 7 and record releasing means capable of imparting movement to the lowest record of the stack in its own plane to disengage it from the shoulder 6 of the spindle so that it may fall down along the spindle 5 into the playing position on the turntable.

The movements of the pick-up arm 3 and the release of a record from the stack on the spindle 5 may be effected by any convenient known form of automatic mechanism (not shown).

Figures 2, 3:
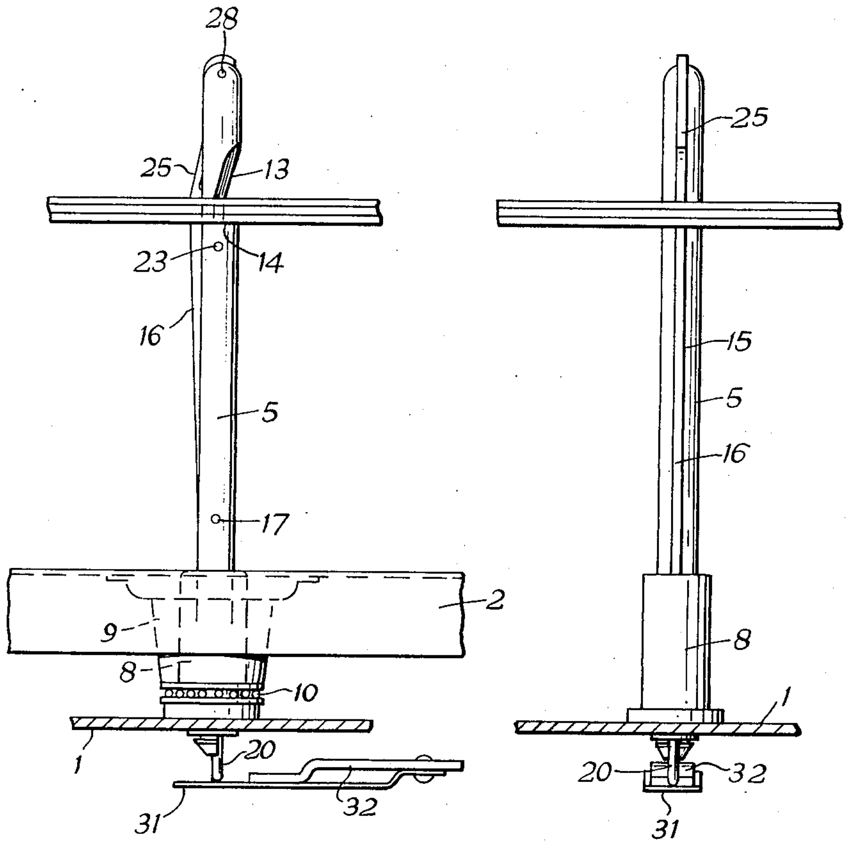
FIG. 2 is a view in side elevation showing the record supporting spindle.
FIG. 3 is a view in side elevation of the spindle looking from the left hand side of FIG. 2.

Referring to FIGS. 2 and 3 a tubular pedestal 8 is fixedly mounted on the motor board 1 and the central boss 9 of the turntable 2 makes guided engagement over the pedestal 8 and rests for rotation on a ball bearing 10.

Figures 4, 5, 6:
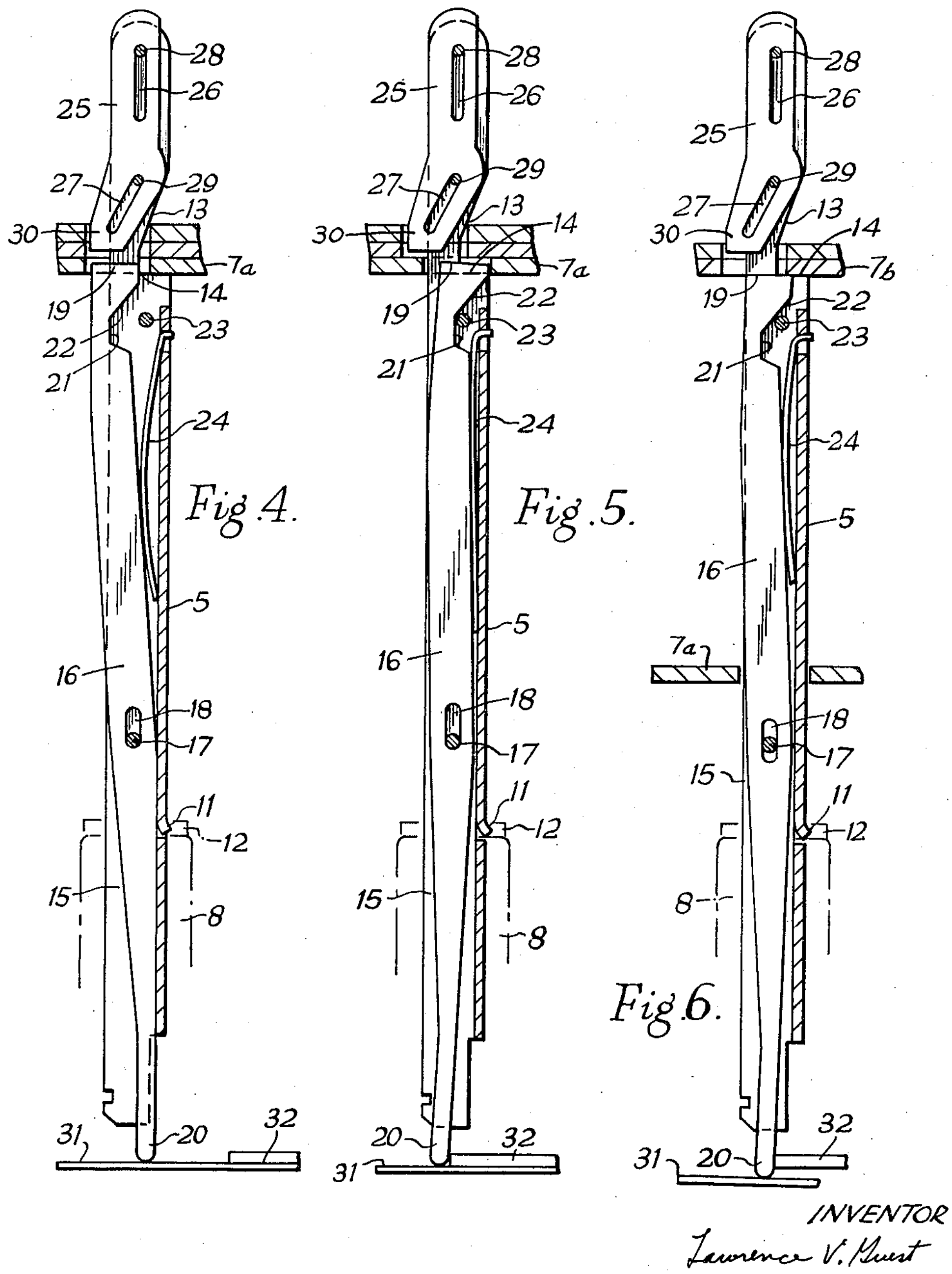
FIGS. 4, 5 and 6 are views in sectional side elevation and on a larger scale showing parts of the record release means in different positions.

The record supporting spindle 5 is engaged at its lower end in the pedestal 8 with its lower end extending below the motor board 1 and it is located and held against rotation by engagement of a lug 11 on the spindle in a recess 12 in the upper end of the pedestal 8 (FIGS. 4, 5 and 6).

The spindle 5 near its upper end is recessed as shown at 13 to present a horizontal shoulder 14 at the lower end of the recess extending approximately half-way across the diameter of the spindle.

The spindle 5 is slotted throughout its length, the slot 15 extending from the side of the spindle 5 away from the shoulder 14 through the major part of the thickness of the spindle and wholly through the thickness of the spindle over a length thereof which includes the shoulder 14.

In the slot 15 in the spindle 5 is mounted a release lever in the form of a single flat bar 16 of a width capable of being housed wholly within the slot 15 in the spindle 5.

The lever 16 is retained in the spindle 5 by the engagement of a pin 17 fixed across the slot 15 in the spindle in an elongated aperture 18 in the lever 16, so that the lever 16 is capable of limited angular rocking movement about pin 17 as a fulcrum and also limited longitudinal up and down movement in the slot 15 in the spindle 5.

The length of the elongated aperture 18 is such that the lever 16 can move between a raised position in which its upper end 19 is above the shoulder 14 by a distance not greater than the thickness of a record and a lowered position in which said upper end 19 is at or below the level of the shoulder 14.

The lower end 20 of the lever 16 extends at all times below the lower end of the spindle 5.

Near the upper end of the lever 16 and at the side thereof towards the shoulder 14 is formed a recess 21 the upper boundary wall of which presents a surface 22 which is inclined to the vertical and across the slot 15 in the spindle is fixed a pin 23 in position for engagement by said inclined surface 22.

A light leaf spring 24 is provided between the bottom of the slot 15 in the spindle 5 and the part of the lever 16 above the pivot pin 17 capable of urging the upper end of the lever 16 in the direction away from the shoulder 14 i.e. counterclockwise in FIGS. 4, 5 and 6, when the lever is free of any record load.

In the upper end of the slot 15 in the spindle 5 is mounted a movable keeper of known form comprising a plate 25 having a vertical slot 26 and an inclined slot 27 engaged respectively over pins 28 and 29 spanning the slot 15 in the spindle 5 and a lateral projection 30 at its lower end which in the rest position of the plate 25, as shown in the drawings, extends into the central holes of all the records except the lowest of a stack supported on the shoulder. The form of the slot 27 in the plate 25 is such that upon lifting the plate 25 it can take a position in which the lateral projection is withdrawn into the slot 15 in the spindle 16.

The lever 16 rests with its lower end 20 upon the end of a leaf spring 31 connected with and extending from the underside of a moving part 32 of the automatic mechanism capable of moving into and out of engagement with and from the lower end 20 of the lever 16 at appropriate times during the execution of an automatic cycle of movements by the machine.

The strength of the leaf spring 31 is such as to be capable of holding the release lever 16 in its raised position when the lever is at rest as shown in FIG. 4 but can be overcome to permit lowering of the lever when the weight of one or more records is applied to the upper end of the lever.

The operation is as follows:

With a stack of records 7 supported on the shoulder 14 and the machine playing, the normal or rest position of the lever 16 is the raised position shown in FIG. 4 in which the lever is held up by the leaf spring 31 with the lower end of the slot 18 engaged with the pivot pin 17 and the side of the upper end of the lever 16 remote from the shoulder 14 projecting outside the slot 15 of the spindle 5 under the urge of the light spring 24 and the upper extremity 19 of the lever engaged in the centre hole in the lowest record of the stack 7 resting on the shoulder 14. In this position the inclined surface 22 of the recess 21 in the lever 16 is spaced from the fixed pin 23.

When, during the following cycle of automatic operations, a fresh record is required to be fed to the playing position the moving part 32 of the automatic mechanism moves into contact with the lower end 20 of the lever 16 to rock the lever 16 to the position shown in FIG. 5, the leaf spring 31 meanwhile sliding below the said lower end 20 and therefore maintaining the lever 16 raised.

During the rocking movement of the lever 16 the upper end thereof moves the lowest record *7a* of the stack in its own plane from the position shown in FIG. 4 to that shown in FIG. 5 in which it is disengaged from the shoulder 14 of the spindle 5, follow-up by the remaining records of the stack above record *7a* being prevented by the projecting end 30 of the keeper 25.

The lowest record *7a* is thus freed to slide down the spindle 5 to the playing position on the turntable 2 or onto the records already on the turntable.

At the termination of the rocking movement of the lever 16 in the above described direction the lower end of the inclined surface 22 in the recess 21 in lever 16 makes engagement with the fixed pin 23.

As the lowest record *7a* is disengaged from the shoulder 14 to slide downwards along the spindle 5 the weight of the remainder of the records in the stack is transferred to the upper end 19 of the lever 16 and as the moving part 32 of the automatic mechanism is retracted i.e. moved to the right in FIGS. 5 and 6 the lever 16 is permitted to make a controlled downward movement under the weight of the records on the upper end thereof, the inclined surface 22 sliding along the fixed pin 23 to rock the upper end of the lever in the direction away from the shoulder 14 of the spindle 5 and the leaf spring 31 being progressively depressed to the position shown in FIG. 6.

Thus a controlled and gentle lowering of the remainder of the stack of records onto the shoulder 14 is achieved and is accompanied by a frictional wipe between the upper end 19 of the lever 16 and the now lowermost record *7b* in the direction ensuring effective engagement of that record with the shoulder 14.

Engagement of the now lowermost record *7b* with the shoulder 14 relieves the lever 16 from the weight of the records and the return rocking movement of the lever 16 about its pivot pin 17 is continued by the light spring 24 until the upper end of the lever 16 moves into register with the central hole of the now lowermost record *7b* of the stack on the shoulder 14 whereupon the lever 16 is raised by the leaf spring 31 at its lower end to take the position shown in FIG. 4 in which its upper end is engaged in the hole of the now lowest record *7b* in preparation for the next succeeding record-releasing operation.

I claim:

1. A disc record supporting and releasing mechanism comprising a spindle presenting a shoulder at one side and spaced from the upper end thereof, a release lever mounted in an axial slot in the spindle and capable of limited up and down movement and transverse rocking movement in said slot, means yieldingly urging said release lever upwards towards a position in which its upper end is engaged in the hole in the lowermost record of a stack on the spindle but below the next to lowermost record in the stack and means yieldingly urging said release lever transversely so that its upper end moves in the direction away from the shoulder, reciprocating means for rocking said lever first in the direction to move its upper end towards the shoulder to disengage the lowermost record therefrom and thereafter permitting said release lever to make a return rocking movement, and co-operating elements on the spindle and on the release lever comprising a surface inclined to the vertical on one and an abutment pin in fixed position on the other adapted to engage one another at a point near one end of the inclined surface when the release lever has been rocked to release the lowermost record, so that the upward bias of the release lever is overcome by transfer of the weight of the remainder of the stack of records to the upper end of the release lever after release of the lowermost record from the shoulder of the spindle and the upper end of the release lever is constrained to move transversely in the direction away from the said shoulder by sliding engagement of the said inclined surface with the said abutment pin during downward movement of the release lever under the weight of said remainder of the stack to urge said remainder of the stack transversely towards the axis of the spindle and to deposit it upon the shoulder of the spindle.

2. A disc record supporting and releasing mechanism comprising a spindle presenting a shoulder at one side and spaced from the upper end thereof, a recessed release lever mounted in an axial slot in the spindle and capable of limited up and down movement and transverse rocking movement in said slot, means yieldingly urging said release lever upwards towards a position in which its upper end is engaged in the hole in the lowermost record of a stack on the spindle but below the next to lowermost record in the stack and means yieldingly urging said release lever transversely so that its upper end is moved in the direction away from the shoulder, reciprocating means for rocking said lever first in the direction to move its upper end towards the shoulder to disengage the lowermost record therefrom thereafter permitting said release lever to make a return rocking movement, and a surface inclined to the vertical and forming a part of the edge of the recess in the recessed release lever and a fixed pin extending across the axial slot in the spindle and in sliding engagement with said surface and rocking the upper end of said release lever in the direction transversely away from said shoulder, during downward movement of the release lever under the weight of the remainder of the stack, to urge said remainder of the stack transversely towards the axis of the spindle and to deposit it upon the shoulder of the spindle.

3. A disc record supporting and releasing mechanism as claimed in claim 1 wherein the release lever extends above and below the level of the turntable and is pin-and-slot connected with the spindle in a manner permitting transverse rocking movement and up and down movement of limited extent relative to the spindle, said release lever being biased upwards by a spring and reciprocating means engaging the end of the release lever below the level of the turntable rocking, said lever positively in the record releasing direction and controlling the return movement of said lever under the weight of records applied to the upper end of the release lever.

References Cited in the file of this patent

UNITED STATES PATENTS

| | | |
|---|---|---|
| 2,726,088 | DaCosta | Dec. 6, 1955 |
| 2,739,817 | Dobrogowski | Mar. 27, 1956 |